Dec. 25, 1945.  W. M. BERG  2,391,671
SELF-RELEASING DIE HOLDER
Filed May 17, 1944
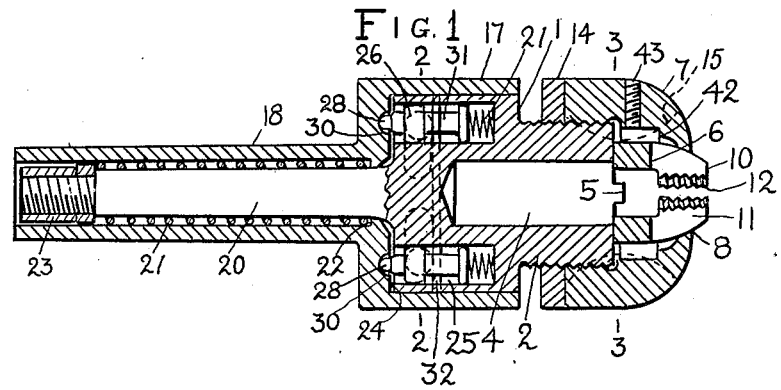
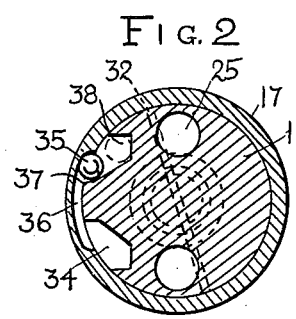
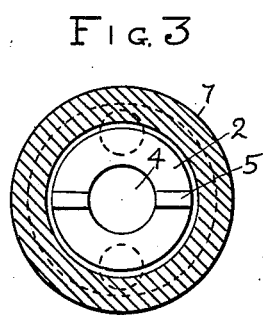
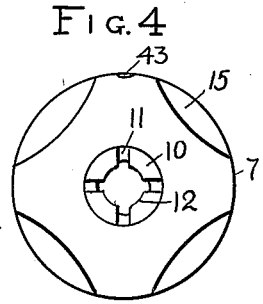
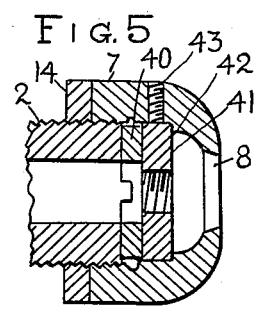
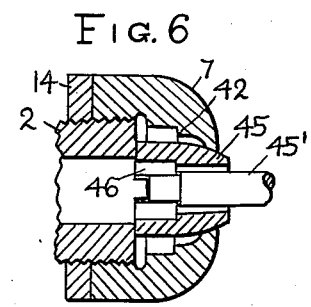
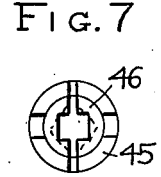
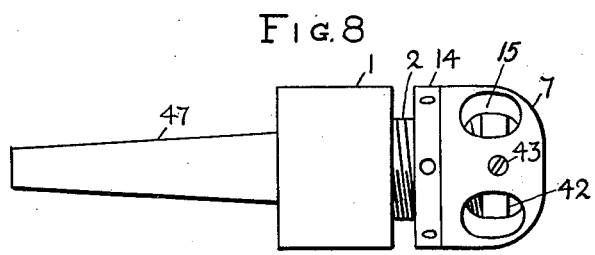
WILLIAM M. BERG
INVENTOR
BY John P. Mironow
ATTORNEY Patented Dec. 25, 1945

2,391,671

UNITED STATES PATENT OFFICE 2,391,671

SELF-RELEASING DIE HOLDER

William M. Berg, New York, N. Y.

Application May 17, 1944, Serial No. 535,925

2 Claims. (Cl. 10—89)

My invention relates to self releasing die holders and has particular reference to die holders especially suitable for use with lathes, drill presses and similar machine tools.

My invention has for its object to provide a die holder which can be held in any suitable chuck on a spindle of a machine tool or on a post of a turret lathe and which can be easily and quickly adapted for the use with round or acorn type dies.

Another object of my invention is to provide a holder which can be used for holding taps of various sizes in an operating position on a lathe or on a drill press.

Still another object of my invention is to provide a die holder which will automatically release the die from further cutting of the thread when the die reaches a predetermined point of its operating movement over the work.

My invention is more fully described in the accompanying specification and drawing in which:

Fig. 1 is a longitudinal section of my die holder with an acorn die and a cylindrical shank;

Fig. 2 is a sectional view taken on the line 2—2 of Fig. 1;

Fig. 3 is a sectional view taken on the line 3—3 of Fig. 1;

Fig. 4 is an end view of the die holder with an acorn die;

Fig. 5 is a fractional sectional view of the die holder with a round die;

Fig. 6 is a similar view of the die holder with a tap and a tap holding attachment;

Fig. 7 is a rear view of the tap holding attachment.

Fig. 8 is an outside view of my device.

My die holder consists of a cylindrical body 1 having a cylindrical extension 2 of a smaller diameter and threaded on the outside. The front end of the body is bored at 4 and the front face is provided with a pair of lugs 5 adapted to engage corresponding recesses in an acorn die 6 or a similar operating tool. A rounded cap 7 is threaded on the extension 2 of the body, the front opening of the cap 8 bearing against tapering or conical front end 10 of the die 6. The front end of the die has slots 11 forming threading lands 12 which cut thread on a piece of work against which the die holder is advanced or which is advanced toward the die. It is evident that the lands 12 can be resiliently moved together by screwing the cap farther on the extension 2 of the main body. The cap is locked in a desired position by a lock nut 14. The cap is provided with large openings 15 at the sides for the removal of the chips and for the admittance of a lubricant or coolant to the cutting portions of the tool. The depth of the bore 4 determines the maximum length of a portion of work to be threaded.

The cylindrical body 1 is rotatively fitted in a tubular cup-shaped member 17 having a tubular shank 18 adapted to be held in a tool post on a turret lathe or in another suitable fixture. The body 1 is provided with a shank 20 extending into the tubular shank 18. A helical spring 21 is placed on the inner shank 20, the front end of the spring resting on a shoulder 22 on the member 17, the rear end of the spring resting against a nut 23 on the end of the shank. The spring urges the rear face of the body 1 toward the inner face 24 of the tubular member 17. The cylindrical body 1 is provided with two holes 25 extending in a direction parallel to the axis of the body. Plungers 26 are slidably fitted in the holes 25 and are urged outward by springs 27. The rounded ends 28 of the plungers engage elongated holes or depressions 30 in the inner face of the tubular member 17, thereby preventing or limiting relative rotation between the body 1 and the member 17. The plungers are of a reduced diameter in their middle portions 31 and are retained in their position by a pin 32 passing through the body and through the holes 25 in spaces between the sides of the holes and the reduced portions 31 of the plungers.

The body 1 is also provided with symmetrically arranged recesses 34 for a locking ball 35. The ball is placed in one or the other recess depending on the direction of the thread, i. e. right or left hand. The ball in Fig. 2 locks the body 1 and the tubular member together for the clockwise rotation of the body, the ball engaging the inner edge of a recess 36 in the tubular member, being pressed by the flat edge 37 of the recess 34. For a counterclockwise direction the ball enters the inner corner 38 and is carried along without being held by the edges of the recess 36.

The holder can be also used for flat or round dies as shown in Fig. 5, an adapter 40 being placed over the lugs 5, the other side of the adapter being flat for supporting one side of a flat die 41. The latter is clamped against the front face of the adapter by a shoulder 42 inside the cap 7. A set screw 43 holds the die against rotation, the end of the screw entering a hole made for this purpose in the edge of the die. The outside view of the die holder with the die 42 is shown in Fig. 8.

My holder can be also used for holding taps as shown in Fig. 6. A tap holder consists of a split outer portion 45 which clamps the body 45' of a tap, and the inner portion consisting of two parts 46 which engage the square end of the tap. The inner portion is interchangeable so that there may be selected a suitable inner portion for any size of the square end of the tap.

In the operation of my die holder, the latter will cut thread on a rotating work as long as there is a pressure applied to the holder which will cause the plungers 26 to engage the depressions 30 in the tubular member. When the die holder is stopped in its advancing movement, however, the continuing threading action of the rotating work will pull the die away from the tubular member, causing the plungers to be released from the depression 30. No further cutting action can then take place and the die will rotate with the work until the rotation is reversed for removing the die from the work.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A self releasing die holder comprising a tubular member; a shank at the rear end of the tubular member; a cylindrical member rotatively supported in the tubular member; a transverse lug at the front end of the cylindrical member; a thread cutting tool having a transverse groove at the rear end for the transverse lug on the cylindrical member; a cap threaded on the front end of the cylindrical member arranged to clamp the thread cutting tool in place; an inner shoulder on the cap for clamping a tap holder in place; cooperating projections and recesses at the rear end of the cylindrical member and at the front side of the bottom portion of the tubular member; yieldable means to move the cylindrical member into the tubular member; and a one way clutch between the tubular and cylindrical members.

2. A self releasing die holder comprising a tubular member; a shank at the rear end of the tubular member; a cylindrical member rotatively supported in the tubular member having bores in the rear portion; plungers movably supported in the bores; yieldable means to move the plunger out of the bores into engagement with recesses in the tubular member; the plungers having annular recesses in the middle; a transversely positioned pin in the cylindrical member engaging the recesses for limiting the outward movement of the plungers; yieldable means to draw the cylindrical member into the tubular member; the cylindrical member having two recesses symmetrically inclined to its axis for a locking ball and extending to the periphery of the cylindrical member; the tubular member having an elongated slot inside extending peripherally for the ball through a limited distance, each of the said recesses, when provided with the ball, being arranged to allow relative rotation between the tubular and the cylindrical member in one direction only.

WILLIAM M. BERG.